Jan. 13, 1953 J. M. RHEINS ET AL 2,625,612

TELEPHONE HOLDER OR SUPPORT

Filed June 22, 1951

INVENTORS.
JOSEPH M. RHEINS
SAMUEL S. KLEIN
BY Zugelter & Zugelter
Attys.

Patented Jan. 13, 1953 2,625,612

UNITED STATES PATENT OFFICE 2,625,612

TELEPHONE HOLDER OR SUPPORT

Joseph M. Rheins and Samuel S. Klein, Cincinnati, Ohio

Application June 22, 1951, Serial No. 232,982

1 Claim. (Cl. 179—157)

This invention relates to supports or holders for telephones of the so-called French type and more particularly to supports that are suspended from the back of a person's neck and supported also on the chest area adjacent the collar bone, while holding the mouth and ear pieces of the telephone in position.

An object of this invention is to provide a relatively simple, inexpensive, and effective telephone holder whereby a person may suspend the phone from the back of his neck, the side of the holder to which the telephone is secured being provided with a chest rest and telephone clamp. The chest rest prevents twisting of the phone while at the same time holding the mouth and ear pieces adjacent the mouth and ear of such person.

Another object of the invention is to provide a holder that may be made from a unitary or single piece of thermo-plastic material in ribbon or strap form.

The above and other objects of the invention will be apparent from the following description taken in conjunction with the accompanying drawings in which.

Figure 2:
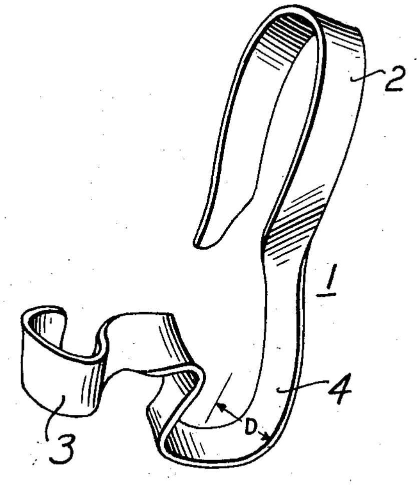
Fig. 2 is a view in perspective of the telephone holder.
Figure 3:
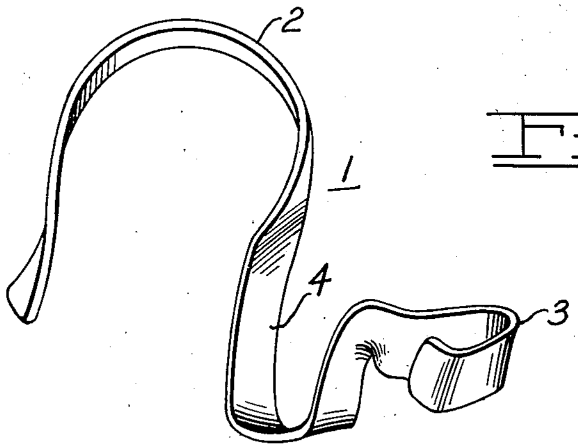
Fig. 3 is a view in perspective of the holder as seen from a different angle.

In the Figs. 2 and 3 of the drawings a telephone holder 1 is shown that is made from a unitary or single piece or strap or ribbon-like thermoplastic material. The plastic is one which may be heated and then shaped to the configuration desired.

As shown, the holder comprises a U-shaped portion, or open neck loop 2, a clamp 3 in which the telephone is secured, and a portion 4 that connects the clamp and one side of the neck loop. Portion 4 is so shaped that it serves as a chest rest.

The neck loop 2 is so formed that a flat side of the ribbon-like material rests against the back of the wearer's neck. The connecting portion 4 extends forwardly of the left side of the neck loop, is twisted at location 6 approximately 90° and bent or looped downwardly a distance D below the lower edge of the neck loop. Clamp 3 rises from the forward end of the chest rest 4 to a point in which a telephone will be supported in the proper position.

Figure 1:
Figure 1 is a pictorial representation of a lady using a telephone holder embodying a form of the invention.

Fig. 1 illustrates the telephone holder 1 in use by a person—a lady, for example. When used, the clamp 3 is attached to a telephone 7 as shown, and the neck loop is placed around the back of the neck. When so placed the chest rest 4 engages the chest at a point to one side of the neck and slightly below the collar bone. The chest rest prevents twisting of the holder 1 and shifting of the telephone out of position so that the person using it need not cock the head in order to keep mouth and ear in the proper location with respect to the mouth 8 and ear pieces 9 of the telephone. The user may sit comfortably and erect as depicted by Fig. 1 while conversing and still have both hands free for the taking of notes, the handling of papers, or for other tasks.

Figure 4:
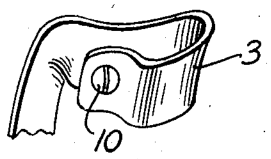
Figs. 4 and 5 are fragmentary side and top plan views, respectively, of a modified form of clamp for the telephone.
Figure 5:
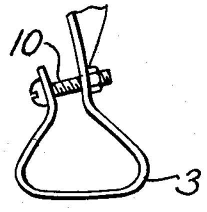

In the form of holder shown in Figs. 2 and 3, the natural resiliency of clamp 3 is relied upon to hold the telephone in position. If it is found that the telephone has a tendency to slip in the clamp, the clamp may be provided with a bolt 10 as shown in Figs. 4 and 5, whereby the clamp may be positively secured to the telephone.

Having thus described the invention, it will be apparent to those skilled in this art that the illustrated embodiments may be modified without departing from either the spirit or the scope of the invention.

Therefore, what we claim as new and desire to be secured by Letters Patent is:

A device of the class described comprising a unitary piece of ribbon-like material having an open loop portion adapted to embrace the back of one's neck with a broad side of the ribbon bearing flatwise against the back of the neck, the ribbon-like material being twisted at one side of the neck loop so that the broad side of the ribbon is substantially at right angles to the broad side of the neck portion, the portion extending forwardly of the twist being bent downwardly to form a chest rest adapted to bear on the chest of the wearer at a point adjacent the collar bone and to one side of the neck, the forward end of said chest rest being bent upwardly and terminating in a loop-clamp in which the handle portion of a telephone may be clamped, the neck loop securing the telephone to the user and the chest rest supporting the telephone and preventing turning thereof out of speaking and listening position.

JOSEPH M. RHEINS.
SAMUEL S. KLEIN.

REFERENCES CITED

The following references are of record in the file of this patent:

UNITED STATES PATENTS

| Number | Name | Date |
|---|---|---|
| 1,939,449 | Horn | Dec. 12, 1933 |

FOREIGN PATENTS

| Number | Country | Date |
|---|---|---|
| 240,912 | Switzerland | May 16, 1946 |